(12) United States Patent
Marchart

(10) Patent No.: US 6,363,805 B1
(45) Date of Patent: Apr. 2, 2002

(54) SYSTEM AND PROCESS FOR CONTROLLING AN AUTOMATICALLY SHIFTING TRANSMISSION

(75) Inventor: Horst Marchart, Stuttgart (DE)

(73) Assignee: Dr. Ing. h.c.f. Porsche AG, Stuttgart (DE)

(*) Notice: Subject to any disclaimer, the term of this patent is extended or adjusted under 35 U.S.C. 154(b) by 0 days.

(21) Appl. No.: 09/534,304

(22) Filed: Mar. 23, 2000

(30) Foreign Application Priority Data

Mar. 23, 1999 (DE) .......................................... 199 12 963

(51) Int. Cl.[7] ............................................. F16H 59/08
(52) U.S. Cl. ......................................................... 74/335
(58) Field of Search ........................................... 74/335

(56) References Cited

U.S. PATENT DOCUMENTS

| | | | | |
|---|---|---|---|---|
| 5,197,344 A | * | 3/1993 | Maier et al. ................... | 74/335 |
| 5,865,705 A | * | 2/1999 | Shamoto et al. ............... | 477/79 |
| 5,873,802 A | * | 2/1999 | Tabata et al. .................. | 477/96 |
| 5,882,277 A | * | 3/1999 | Iizuka ........................... | 477/125 |
| 6,035,735 A | * | 3/2000 | Graf et al. ..................... | 74/335 |

FOREIGN PATENT DOCUMENTS

| | | |
|---|---|---|
| DE | 3626100 | 2/1987 |
| DE | 4311886 | 10/1994 |
| DE | 19533305 | 3/1997 |
| DE | 19736406 | 3/1999 |
| DE | 29923165 U1 * | 9/2000 |

OTHER PUBLICATIONS

German Journal DE–Z *Automobiltechnische Zeitschrift*, vol. Jun. 1990, pp. 308–319.
Swiss Journal CH–Z *Automobil Revue*, vol. 51/1992, p. 23.
German Journal DEZ *Auto Motor Sport*, vol. 22/1991, p. 300.

* cited by examiner

Primary Examiner—Dirk Wright
(74) Attorney, Agent, or Firm—Crowell & Moring LLP

(57) ABSTRACT

A system and a process are provided so that a transmission, which is automatically shifting per se, can be operated a driving position switch for a first automatic operating mode and a switching rocker for a second operating mode influenced by the driver. In order to provide such a system and a process which has a selecting device and can be influenced for a short time by the driver, the control unit changes, from the automatic operating mode normally selected in a position D of the first selecting device (of the driving position switch), without the selection by the first selecting device, temporarily into the operating mode influenced by the driver when a second selecting device (a rocker or another signal device) arranged on the steering wheel is actuated.

16 Claims, 2 Drawing Sheets

SYSTEM AND PROCESS FOR CONTROLLING AN AUTOMATICALLY SHIFTING TRANSMISSION

BACKGROUND AND SUMMARY OF THE INVENTION

This application claims the priority of 199 12 963.0, Filed Mar. 23, 1999, the disclosure of which is expressly incorporated by reference herein.

The present invention relates to a system and a process for controlling an automatically shifting transmission for a vehicle.

In order to provide the driver of a vehicle with an automatic shift transmission in special situations with the possibility of directly influencing the selected transmission ratio, German Journal DE-Z Automobiltechnische Zeitschrift, Volume 6/1990, pages 308 to 319, the provision of, so addition to an automatic operation, a manual operation in that the driver can directly select individual gears of the step-type automatic system. For this purpose, parallel to a shifting channel for the automatic operation, a second shifting channel is provided for the manual operation so that the driver can cause, with a rocker-type movement of a shifting lever, can in each case cause a downshifting or upshifting by one gear. A similar system for continuous transmissions is known from Swiss Journal CH-Z Automobil Revue, Volume 51/1992, page 23.

Furthermore, it is known to cause gear shifts in a power-operated transmission by a selecting device from a steering wheel of a vehicle as seen, for example, German Journal DE-Z Auto Motor Sport, Volume 22/1991, Page 300.

In addition, DE 43 11 886 A1, A describes a system and a process for controlling an automatically shifting transmission. The control changes from an automatic operating mode to a manual operating mode when a position M is touched by way of a driving position switch or when, by way of a shifting rocker provided in the steering wheel, a shifting signal is emitted for a defined time period, for example, 0.7 seconds. The manual operating mode is exited again when an M position is touched again by way of the driving position switch or an upshift signal is emitted for a defined time period, for example, 1.5 seconds. Finally, the operating mode influenced by the driver may be caused to be exited if this operating mode had been active for a defined time period. However, on the whole, a change-over is always involved from the automatic to the manual operating mode and vice versa.

SUMMARY OF THE INVENTION

An object of the present invention is to provide a system and a process so that an automatically shifting transmission having a selecting device can be influenced by the driver for a short time.

According to the invention, this object has achieved by providing a control unit triggering the transmission being operable in two operating modes, the selection of the operating mode taking place by a first selecting device, in a first automatic operating mode, ratios of the transmission being adjusted essentially automatically according to operating values determined by generating devices and, in a second operating mode influenced by the driver, ratios of the transmission being adjusted essentially as a function of the signal of a first selecting device, characterized in that the control unit can be temporarily changed from the first operating mode, without the selection by the first selecting device by actuating the second selecting device, into the second operating mode.

For this purpose, the control changes from the automatic operating mode normally selected in a position D of the first selecting device (of the driving position switch), without any selection by the first selecting device, temporarily into the operating mode influenced by the driver when a second selecting device (a rocker or other signalling device) is actuated which is arranged on the steering wheel. In this case, it is particularly advantageous that this change-over requires no lasting exiting of the automatic operating mode.

The present invention is therefore particularly suitable for initiating a downshifting in front of a curve in the road or when entering a town. Following the brief direct influencing by the driver when selecting the transmission gear, the automatic operating mode becomes active again. In this case, the duration is preferably firmly set and preferably starts again with each actuation of the selecting device arranged on the steering wheel. However, it is also contemplated to make the election of the duration a function of operating parameters of the vehicle, such as the driving speed, the rotational speed or the transmission gear.

The operating parameters may also be replaced by a quantity evaluating the driving style. In addition, the present invention can be used independently of the selected construction of the transmission and can be used particularly for multi-step transmissions and infinitely variable speed transmissions. It is also independent of the spacial arrangement of the selecting devices and their construction.

A differentiating device, provided for analyzing the signals of the two selecting devices, defines one of two transmission ratio determination devices for the selection of the transmission ratio. One operating mode is assigned to each transmission ratio determination device. Preferably, two signal analysis devices and one change-over device are provided for this purpose. While the signal analysis devices are each assigned to a selecting device respectively and analyze its signals, the change-over device is responsible for the selection of the transmission ratio determination device, that is, the operating mode, as a function of the signals of the signal analysis devices.

Between the signal analysis device for the second selecting device and the change-over device, a time element is provided in the form of a switch-off delay. This time element provides that a signal of the second selecting device is maintained for a defined time period. It is particularly advantageous for the time element to be set back by a signal of a kick-down switch. As a result, by way of a kick-down, the first automatic operating mode can immediately be activated again, and there is no risk that the driver, for example, during a passing maneuver, does not initiate the required triggering of a transmission ratio change.

As an alternative or supplementary thereto, the time element receives a signal of a lateral-acceleration limit value generator and a signal of a drive/coasting detector. After the expiration of time, the time element will be set back only if there is a falling below a preadjusted amount of lateral acceleration and a drive operation exists at the same time. No drive operation also is to be detected when the vehicle is parked or is rolling without any operation of the accelerator pedal. As a result of this measure, for example, during a fast cornering, no change takes place from the manual to the automatic operating mode, and the manually selected transmission ratio is maintained in the coasting operation. This is particularly useful when driving downhill, when entering a town or when selecting the transmission ratio corresponding to the first gear in front of a red traffic light.

Furthermore, after a change of the operating mode by the actuation of the second selecting device, this actuation of the second selection device is not interpreted as a command for changing the transmission ratio. A change of the transmission ratio will then not take place before the next actuation of the second selecting device. As an alternative, after a change of the operating mode, the command for changing the transmission ratio is implemented immediately.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
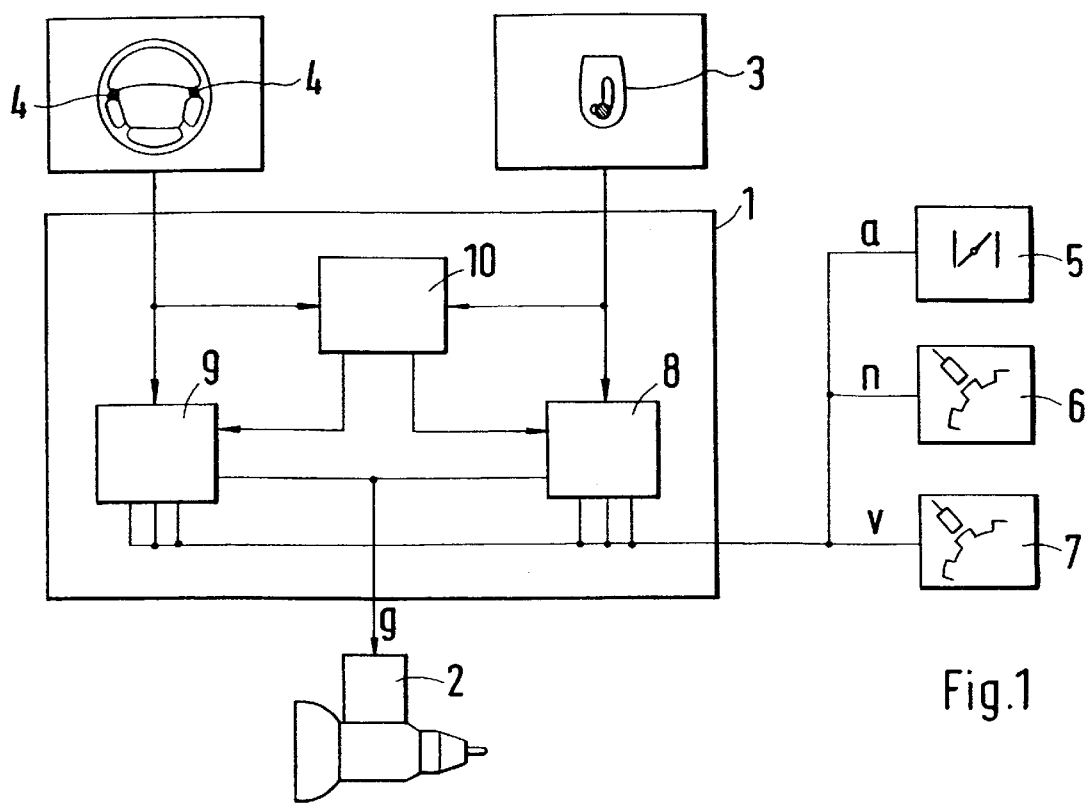
FIG. 1 is a schematic view of the control unit according to the present invention.

A control unit 1 illustrated in FIG. 1 controls an automatic transmission 2 and receives signals from a driving position switch 3, a shifting rocker 4 arranged on a steering wheel, a throttle valve generator 5, a rotational engine speed generator 6 and a driving speed generator 7. The automatic transmission 2 receives a gear signal, g, from the control unit 1 and engages the transmission gear demanded by the gear signal g. The driving position switch 3 has a first channel for operating a first automatic operating mode with the steps and driving positions P, R, N, D, 3, 2, 1. In position P, the transmission is blocked on the output side for parking the vehicle. In position R, a reverse gear is engaged. In position N, no gear is engaged. In position D, the transmission gear g to be engaged is determined from operating parameters of the vehicle. The positions 3, 2 and 2 correspond to position D; however, the highest transmission gear g to be engaged is determined by the position of the driving position switch 3. Positions 3, 2 and 1 are optional.

Starting from this first channel, a recess, which is marked M, is provided opposite the position D. A selector provided as an operating element of the driving switch 3 engages in all positions. The switching rocker 4 is arranged on the steering wheel such that it is situated in the driver's gripping range and has, in addition to a neutral center position, two shifting positions HS and RS from which, after the actuation, it automatically returns into the neutral center position. The two shifting positions trigger a corresponding upshift signal HS or a downshift signal RS. The throttle valve generator 5 supplies a throttle valve signal a to the control unit 1; the rotational engine speed generator 6 supplies a rotational engine speed signal n; and the driving speed generator 7 supplies a driving speed signal $\underline{\underline{v}}$.

The control unit 1 has a first transmission ratio determination device 8 for the first automatic operating mode and a second transmission ratio determination device 9 for the second operating mode influenced by the driver as well as a differentiating device 10. The first transmission ratio determination device 8 receives the signals of the driving position switch 3 and determines therefrom, as a function of the throttle valve signal a, rotational engine speed signal n and driving speed signal $\underline{\underline{v}}$ operating values, the gear position to be engaged, which it then transmits in the form of the gear position signal $\underline{\underline{g}}$ to the transmission 2.

The second transmission ratio determination device 9 receives the shifting signals HS/RS of the switching rocker 4 and generates therefrom the gear position signal g, with the throttle valve signal a, rotational engine speed signal n, driving speed signal $\underline{\underline{v}}$ operating values being used for plausibility tests and safety measures, such as the protection against overspeeding, stalling and similar safety measures. The gear position signal g is emitted only with the descending edge of the shifting signal HS/RS, that is, when the switching rocker 4 is released.

The differentiating device 10 analyzes the signals of the driving position switch 3 and of the switching rocker 4 and determines therefrom whether the first transmission ratio determination device 8 or the second transmission ratio determination device 9 is activated.

Figure 2:
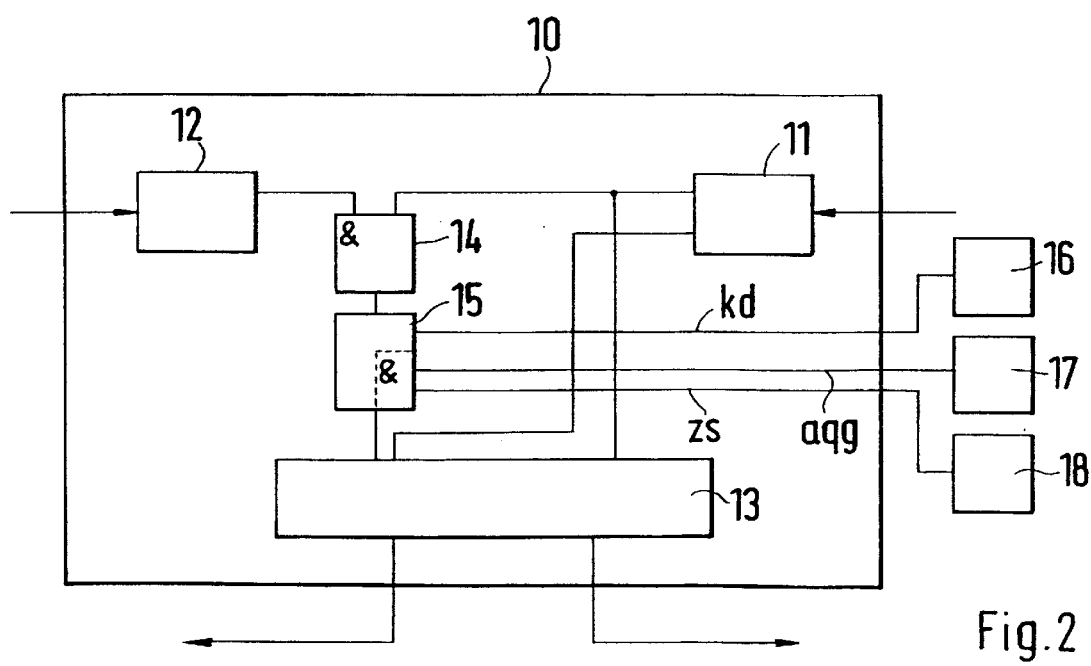
FIG. 2 is a schematic view of a change-over device of the control unit.

The construction of the differentiating device 10 is described in FIG. 2. A first signal analyzing device 11 is connected with the driving position switch 3, and a second signal analyzing device 12 is connected with the switching rocker 4. The output signals of the signal analysis devices 11, 12 are supplied to a change-over device 13 which, in turn, activates either the first transmission ratio determination device 8 or the second transmission ratio determination device 9 but never both simultaneously. For this purpose, an input AUT and an input MAN are provided on the change-over device 13. A signal at the input AUT causes the change-over device 13 to activate the first transmission ratio determination device 8 and thus select the automatic operating mode. A signal at the input MAN activates the second transmission ratio determination device 9 and selects the operating mode influenced by the driver via the switching rocker 4. The two inputs MAN and AUT can receive several signals and link these signals with one another, possibly also logically.

The first signal analysis device 11 detects from the analysis of the signal of the driving position switch 3 whether this driving position switch 3 is in the M position. If this is so, the first signal analysis device 11 emits a signal to the input MAN of the change-over device 13, so that the operating mode is now selected which is influenced by the driver. If the first signal analysis device 11 detects that the driving position switch 3 is no longer in the M position, it emits a signal to the input AUT of the change-over device 13 and thereby selects the automatic operating mode. On the whole, the change-over device 13 activates the first transmission ratio determination device 8 as long as the driving position switch 3 is in the D position, and it activates the second transmission ratio determination device 9 as long as the driving position switch 3 is in the M position.

The second signal analysis device 12 analyzes the signal of the switching rocker 4 to the extent that it examines whether an upshift signal HS or a downshift signal RS is present. If this is so, a signal is emitted to an AND element 14. The other input age of the AND element 14 is connected with an output of the first signal detection device 11 which emits a signal when the driving position switch 3 is in the D position.

The output of the AND element 14 leads to a delay element 15 which contains a switch-off delay of a programmable duration t. The output of the delay element 15 is connected with the input MAN of the change-over device 13. The delay element 15 also receives a signal, kd, of a kick-down switch 16. If such a signal kd is present at the delay element 15, the delay element 15 is immediately set back and will no longer emit a signal.

By way of additional inputs linked by an internal AND element, the delay element 15 also receives signals aqg of a lateral acceleration limit value generator 17 and zs of a drive/coasting detector 18. In this case, the lateral acceleration limit value generator 17 emits the signal aqg if the extent of the lateral acceleration exceeds a preset value, aqmax. The drive/coasting detector 18 emits the signal zs if a coasting operation is taking place. As long as both signals aqg, zs are simultaneously present at the delay element 15, the output signal of the delay element 15 is also maintained after the expiration of the programmed duration $\underline{t}$.

Instead of the AND element 14 and of the delay element 15, the above-described processing of the shifting signal HS/RS, of the signal D of the driving position switch 3, and of the signals kd, aqg and zs can take place with the same effect also in the change-over device 13.

The vehicle is first operated in the automatic operating mode; that is, the transmission gear to be engaged is automatically determined from the operating values of the vehicle and is set. If the driver now wants to change into the second, driver-influenced operating mode, the driver moves the driving position switch 3 from position D to position M. By way of the switching rocker 4 in the steering wheel, the driver can now trigger upshifts and downshifts by actuating the switching rocker 4 in the sense of an upshift or in the sense of a downshift. If the vehicle reaches operating limits (overspeeding, stalling, and similar limits) for the just engaged transmission gear, which can be detected by the control unit, a shifting is triggered even without a shifting command by the driver in order to return the vehicle into the permissible operating ranges.

As an alternative thereto, the driver can arrive for a short time in the second driver-influenced operating mode by demanding in position D of the driving position switch 3 an upshifting or a downshifting by way of the switching rocker 4. In this case, in addition to the change into the second operating mode, subsequently to the change, the demanded shifting is carried out because the signal of the switching rocker 4 is present at the second transmission ratio determination device 9 (triggering of the gear position signal $\underline{g}$ with the negative edge of the shifting signals HS/RS).

The first automatic operating mode is automatically selected again when the programmed duration $\underline{t}$ has expired after the shifting signal HS of the downshifting and the amount of the lateral acceleration is below a defined limit value and there is also no coasting operation. If, during the time period of this short-term demand of the second operating mode influenced by the driver, a signal kd of a kick-down switch 16 is present, the first automatic operating mode is immediately selected again.

As an alternative, the second transmission ratio determination device 9 may be configured such that it does not accept the signal from the rocker 4 which led to the change into the second operating mode. A gear change will then be carried out only upon another demand by the rocker 4.

As a supplement thereto, it may be provided, for example, for a "rocking-out" in wintry road conditions, that the driver can directly influence the selection of the gear also in position R of the driving position switch 3 by actuating the switching rocker 4. In this case, the driver is limited to the first transmission gear and the reverse gear, so that, as the result of an upshift command, the first transmission gear is engaged and, as the result of the downshift command, the reverse gear is engaged, and the driver can therefore change rapidly between these two gears.

Figure 3:
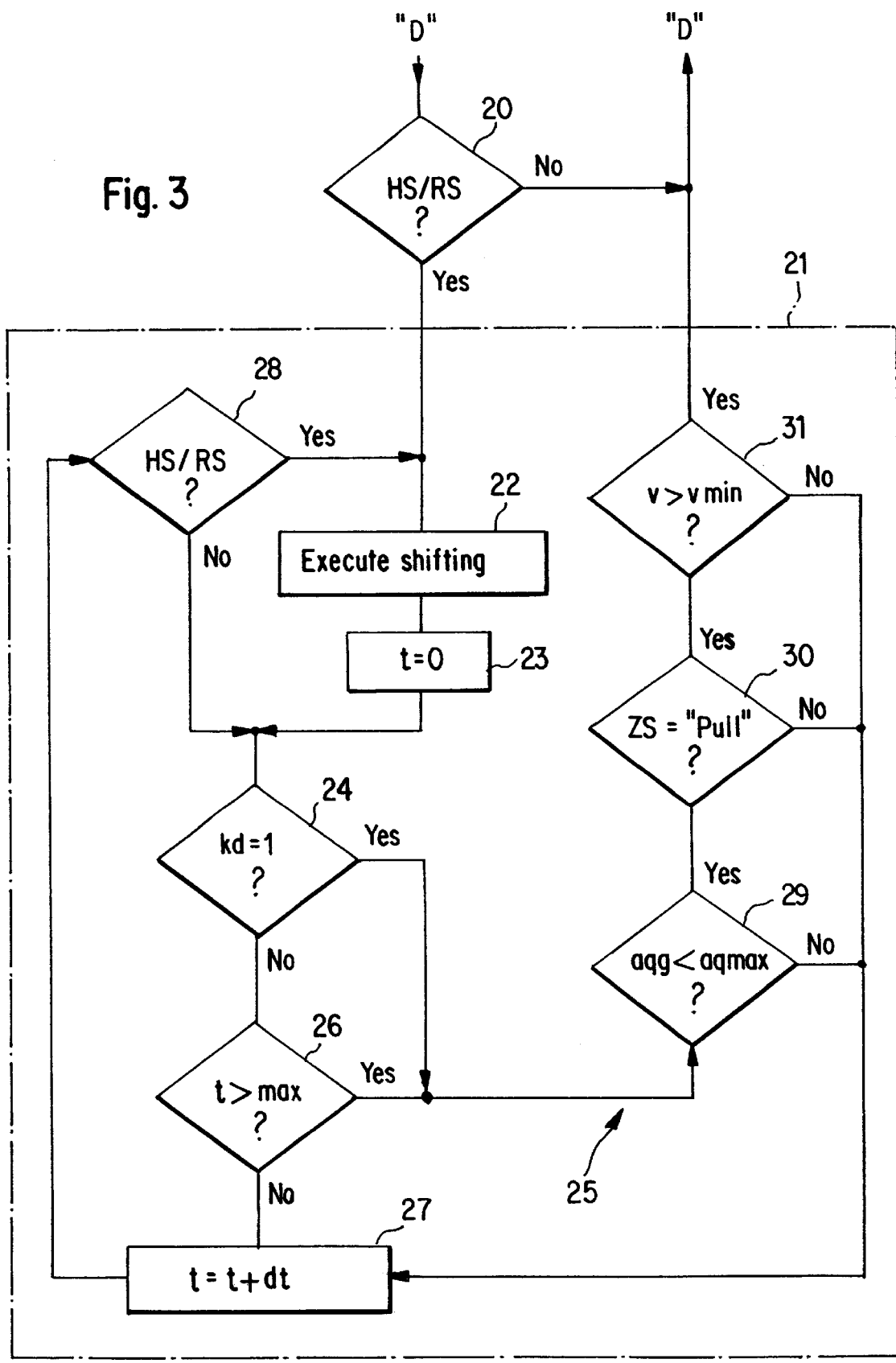
FIG. 3 is a flow chart of the process according to the invention.

The control unit 1 can, of course, also be constructed in the form of a microcomputer. Such a microcomputer operates according to a program established according to the following processes. By way of a group of steps, the control unit 1 first triggers the transmission 2 in the first automatic operating mode, in that it determines the transmission gear to be engaged according to the throttle valve signal $\underline{\underline{a}}$, rotational engine speed signal n and driving speed signal $\overline{\underline{v}}$ operating values through stored characteristic diagrams, and emits a request for this transmission gear to the transmission 2. In a part of this process, the signal of the rocker 4 is queried. The step 20 illustrated in FIG. 3 is a component of this query. In step 20, it is examined whether the switching rocker 4 has emitted an upshift or a downshift signal HS/RS. If this is not so, the control unit 1 remains in its automatic operating mode; characterized here by the driving position D. If, in contrast, an upshift or downshift signal HS/RS is present, a branching takes place into the program for manual short-term influencing 21.

The program 21 starts in its first step 22 with the implementation of the shifting requested by the upshift or downshift signal HS/RS. This first step 22 is not provided in an alternative implementation of the process if the program 21 first is to be only called by a first upshift or downshift signal HS/RS, without a shifting being carried out immediately.

In the next step 23, a time counter $\underline{\underline{t}}$ is set back to the zero value. In step 24, a kickdown signal $\overline{\underline{kd}}$ is queried. If such a signal is present, its ascending routine 25 is branched. Otherwise, the program is continued with step 26, in which it is examined whether the counter t has reached its maximal value here corresponding to a duration of 8 seconds. If the maximal value has been reached or exceeded, a branching to the ascending routine 25 also takes place, and otherwise the program is continued in step 27 in that the time counter t is increased by a time increment dt.

The next step 28 again examines whether an upshift or a downshift signal HS/RS is present. If this signal is present, the program sequence is continued with step 22, while otherwise a direct branching to step 24 takes place.

The ascending routine 25 consists of three checking steps 29 to 31. The first checking step 29 checks whether the signal AQG for the lateral acceleration of the vehicle is smaller than a preset maximal value $AQ_{max}$. The next step 30 checks whether the signal ZS indicates a drive operation of the vehicle.

Finally, step 31 checks whether the driving speed v of the vehicle is higher than a minimal value, here 5 km/h. If one of the conditions checked in steps 29 to 31 has not been met, the program sequence is continued in step 27. If, in contrast, all three conditions have been met, the program 21 is exited.

Concerning the signal zs of the drive/coasting detector 18, it should be noted that, in the present embodiment, the signal zs will assume the "coasting" value when the vehicle is stopped or is rolling at a low speed (lower than 5 km/h). In contrast, In the normal driving operation, the signal zs is determined in a manner known per se from the position of the throttle valve DK or by alternative methods.

As a result, the effect occurs in steps 30 and 31 that the program cannot be exited when the vehicle is stopped, or is rolling and the accelerator pedal is not actuated. It is therefore possible, for example, to select the first gear as the starting gear by an actuating of the switching rocker 4, while, in driving position D of the automatic operating mode, the second gear is regularly used as the starting gear.

It is understood that there must be no automatic shifting as long as the program 21 is active. Other special functions, which can be provided in the driving position D, are terminated when the program 21 is implemented. However, shifting operations initiated by these other programs will still be terminated. Program 21 therefore has priority over all other shifting programs with the exception of safety measures, such as the protection against overspeeding and the protection against stalling.

Gear positions, to which preset transmission ratios correspond in the case of infinitely variable speed transmissions, are replaced by the ratio of the transmission in the case of the infinitely variable speed transmission. This ratio can be influenced by the switching rocker 4 actuated by the driver in the second operating mode in the sense of an increase or a decrease.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. System for controlling an automatically shifting transmission for a vehicle, comprising a control unit configured to trigger the transmission and being operable in two operating modes, the selection of one of the two operating modes taking place by a first selecting device, such that in a first of the operation modes which is an automatic operating mode, ratios of the transmission being adjusted substantially automatically according to operating values determined by generating devices and, in a second of the operating modes which is a driver-influenced operating mode, the ratios of the transmission being adjusted substantially as a function of the signal of a first selecting device, wherein the control unit is configured to be temporarily changeable from the first automatic operating mode, without the selection by the first selecting device by actuating the second selecting device, into the driver-influenced operating mode.

2. System according to claim 1, wherein the control system further comprises a differentiating device which analyzes signals of the selecting devices and then to activate a first transmission ratio determination device for the automatic operating mode or to activate a second transmission ratio determination device for the driver-influenced operating mode.

3. System according to claim 2, wherein the differentiating device comprises a first and a second signal analysis device as well as and a change-over device.

4. System according to claim 3, wherein the differentiating device further comprises a first time element which is provided operatively arranged between the second signal analysis device and the change-over device and to emit, upon an output signal of the second signal analysis device, a signal of defined duration to the change-over device.

5. System according to claim 4, wherein a second time element is arranged to receive a signal of a kick-down switch and to be set back upon receipt of such a signal.

6. System according to claim 4, wherein a second time element is operatively arranged to receive a signal of a lateral acceleration limit value generator and a signal of a drive/coasting detector and to maintain the output signal of the time element when the signal of the lateral acceleration limit value generator exceeds a preset amount and simultaneously the signal of the drive/coasting detector indicates a coasting operation.

7. System according to claim 1, wherein the second signal analysis device is configured to trigger, upon actuation of the second selecting device, the change-over device in the sense of activating the second transmission ratio determination device not taking which does not take into account the signal of the second selecting device for the selection of the transmission ratio.

8. Process for controlling an automatically shifting transmission for a vehicle which has a control unit triggering the transmission, two selecting devices and generating devices for operating values of the vehicle, comprising a first group of steps for implementing a first automatic operating mode according to a first of the selecting denies, and a second group of steps for implementing a second operating mode influenced by the driver according to a second of the selecting devices, wherein a temporary change takes place from the first group of steps to the second group of steps when a query indicates that the second selecting device is emitting a signal.

9. Process according to claim 8, wherein a change from the second group to the first group is implemented when a defined dwell time in the second group of steps has expired.

10. Process according to claim 8, wherein in that a change from the second group to the first group is definitely carried out when a signal of a kickdown switch is present.

11. Process according to claim 8, wherein a change from the second group to the first group is prevented when a signal of a lateral acceleration generator exceeds a defined limit value and simultaneously a signal of a drive/coasting detector indicates a coasting operation.

12. Process according to claim 11, when the change from the second group to the first group is prevented when a signal for a driving speed of the vehicle exceeds a preset limit value.

13. Process according to claim 8, wherein, in the second group of steps, the signal of the second selecting device, which resulted in the change into the second group of steps, is stored and subsequently implemented.

14. Process according to claim 8, wherein, in the second group of steps, the signal of the second selecting device, which resulted in the change into the second group of steps, is not stored and not implemented.

15. Process according to claim 8, wherein, provided that the first selecting device is in a third position, it is only, when in the second group of steps, as a result of signals of the second selecting device, to engage a first transmission gear or a reverse gear.

16. Control unit having a microcomputer and a program for simulating a process for controlling an automatically shifting transmission for a vehicle which has a control unit triggering the transmission, two selecting devices and generating devices for operating values of the vehicle, in which a first group of steps implement a first automatic operating mode according to a first of the selecting denies and a second group of steps implement a second operating mode influenced by the driver according to a second of the selecting devices, wherein a temporary change takes place from the first group to the second group of steps when a query indicates that the second selecting device is emitting a signal.

* * * * *